United States Patent
Leverger et al.

(10) Patent No.: US 11,274,690 B2
(45) Date of Patent: Mar. 15, 2022

(54) FLUID-TIGHT FASTENER ASSEMBLIES

(71) Applicant: ILLINOIS TOOL WORKS INC., Glenview, IL (US)

(72) Inventors: Eric Leverger, Epone (FR); Laurent Huet, Meru (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/122,377

(22) Filed: Dec. 15, 2020

(65) Prior Publication Data

US 2021/0095709 A1   Apr. 1, 2021

Related U.S. Application Data

(63) Continuation of application No. 16/092,702, filed as application No. PCT/US2017/044288 on Jul. 28, 2017, now abandoned.

(60) Provisional application No. 62/412,903, filed on Oct. 26, 2016.

(51) Int. Cl.
  *F16B 21/07*   (2006.01)
  *F16B 5/06*   (2006.01)

(52) U.S. Cl.
  CPC .......... *F16B 21/075* (2013.01); *F16B 5/0642* (2013.01)

(58) Field of Classification Search
  CPC .... F16B 21/075; F16B 5/0642; F16B 5/0614; F16B 5/065; B60R 13/0206; Y10T 24/309
  See application file for complete search history.

(56) References Cited

U.S. PATENT DOCUMENTS

| | | | |
|---|---|---|---|
| 4,822,092 A | 4/1989 | Sweers | |
| 5,533,237 A | 7/1996 | Higgins | |
| 6,048,147 A | 4/2000 | Arisaka et al. | |
| 7,048,486 B2* | 5/2006 | Schaty | B62D 25/24 411/258 |
| 7,134,170 B2* | 11/2006 | Gibbons | F16B 5/065 24/289 |
| 7,444,721 B2 | 11/2008 | Smith et al. | |
| 8,882,072 B2* | 11/2014 | Hattori | F16B 21/075 248/346.03 |
| 9,132,789 B2* | 9/2015 | Suzuki | F16B 21/075 |
| 9,302,569 B2* | 4/2016 | Ogino | B60R 13/0206 |
| 9,303,665 B2 | 4/2016 | Steltz et al. | |
| 9,790,976 B2* | 10/2017 | Nakajima | F16B 19/1081 |
| 9,914,408 B2 | 3/2018 | Dickinson et al. | |
| 10,336,265 B2 | 7/2019 | Dickinson et al. | |
| 2002/0001502 A1 | 1/2002 | Smith et al. | |

(Continued)

OTHER PUBLICATIONS

International Search Report and Written Opinion, International Application No. PCT/US2017/044288 dated Oct. 12, 2017, 13 pages.

*Primary Examiner* — Robert Sandy
*Assistant Examiner* — Louis A Mercado
(74) *Attorney, Agent, or Firm* — Quarles & Brady LLP

(57) ABSTRACT

A fastener assembly is configured to securely couple to one or more components. The fastener assembly includes a retaining clip, and a fluid-tight housing coupled to the retaining clip. The fluid-tight housing is configured to provide fluid-tight interfaces with the retaining clip and the one or more components. The fluid tight housing includes an outer cap and an outwardly-flared skirt extending from the outer cap. The fluid-tight housing further includes couplers extending downwardly from the fluid-tight housing on opposite sides of the fluid-tight housing.

19 Claims, 4 Drawing Sheets

(56) References Cited

U.S. PATENT DOCUMENTS

| | | |
|---|---|---|
| 2015/0321622 A1 | 11/2015 | Dickinson et al. |
| 2016/0375840 A1 | 12/2016 | Dickinson et al. |
| 2018/0222429 A1* | 8/2018 | Marini ................... F16B 2/08 |
| 2019/0017527 A1 | 1/2019 | Dickinson |
| 2019/0170178 A1 | 6/2019 | Leverger et al. |
| 2019/0323530 A1 | 10/2019 | Lee |

* cited by examiner

FLUID-TIGHT FASTENER ASSEMBLIES

RELATED APPLICATIONS

This application claims priority to U.S. application Ser. No. 16/092,702 filed on Oct. 10, 2018, now abandoned, which represents the United States National Stage of International Application No. PCT/US2017/044288, filed on Jul. 28, 2017, which claims priority to U.S. Provisional Patent Application No. 62/412,903, filed on Oct. 26, 2016, each of which is incorporated herein by reference in its entirety.

FIELD OF EMBODIMENTS OF THE DISCLOSURE

Embodiments of the present disclosure generally relate to fastener assemblies that are configured to connect components together, and, more particularly to fluid-tight fastener assemblies that provide a fluid-tight sealing interface with a component.

BACKGROUND

Various components are secured together through fasteners. For example, panels, sheets, frames, and the like may be secured together through fastener assemblies that include a male fastening member that securely mates with a female fastening member.

A fastener assembly may be used to secure a first component (such as trim molding) to a second component (such as sheet metal). A female fastening member may of the fastener assembly may be urged into a slot of a panel, for example.

Fastener assemblies including a male fastening member and a female fastening member that is received within a slot of a panel may be used with respect to various components of vehicle, such as belt line molding bumper step pad, rocker molding, storage compartments, door armrest, seatback attachments, instrument panels, and the like. Various known fastener assemblies including male and female fastening members are ergonomic, and may be installed with a relatively low force.

However, it has been found that moisture may infiltrate between secured components through known fastener assemblies. For example, water may pass into one or both components through various channels, gaps, and the like of the fastener assemblies.

SUMMARY OF EMBODIMENTS OF THE DISCLOSURE

A need exists for a watertight fastener assembly that is used to securely couple components together.

According to a first aspect, a fastener assembly is configured to securely couple to one or more components. The fastener assembly comprises a retaining clip and a fluid-tight housing coupled to the retaining clip. The fluid-tight housing is configured to provide fluid-tight interfaces with the retaining clip and the one or more components. The fluid-tight housing comprises an outer cap and an outwardly-flared skirt that extends from the outer cap. The fluid-tight housing further comprises couplers that extend downwardly from the fluid-tight housing on opposite sides of the fluid-tight housing.

According to some embodiments, the fluid-tight housing is overmolded onto a portion of the retaining clip. In other embodiments, the fluid-tight housing is formed of rubber, and the retaining clip is formed of plastic. In further embodiments, a central clip channel is formed through the fluid-tight housing. The fluid-tight housing provides a cover that fits over and onto an upper portion of the retaining clip. In additional embodiments, the retaining clip comprises opposed receiving legs connected together at a distal hinge. The fastener assembly further comprises a male fastening member that is configured to be securely coupled to the retaining clip between the opposed receiving legs.

According to another aspect, a fastener assembly is configured to securely couple to one or more components. The fastener assembly comprises a retaining clip and a fluid tight housing. The retaining clip comprises opposed receiving legs connected together at a hinge. The fluid-tight housing is coupled to the receiving legs and comprises a central clip channel formed through the fluid-tight housing. The fluid-tight housing is configured to provide fluid-tight interfaces with the retaining clip and the one or more components. Further, the fluid-tight housing is overmolded onto a portion of the retaining clip. The fluid-tight housing also comprises a cap and an outwardly-flared skirt that extends from the cap. The fluid-tight housing further comprises couplers that extend downwardly from the fluid-tight housing on opposite sides of the central clip channel.

According to some embodiments, the couplers are secured to the receiving legs. The couplers are configured to fit within a space between the receiving legs. In other embodiments, the fluid-tight housing comprises a base integrally formed with the retaining clip. In further embodiments, the receiving legs comprise latching arms. In additional embodiments, the retaining clip extends through the central clip channel of the fluid-tight housing. In some embodiments, the fastener assembly further comprises a male fastening member that is configured to be securely coupled to the retaining clip between the opposed receiving legs. In other embodiments, the retaining clip is formed of a plastic, and the fluid-tight housing is formed of rubber that is softer than the plastic.

According to yet another aspect, a fastener assembly is configured to securely couple to one or more components. The fastener assembly comprises a retaining clip and a fluid-tight housing. The retaining clip comprises opposed receiving legs. The fluid-tight housing comprises a body that includes an outer cap and an outwardly-flared skirt that extends from the outer cap. The fluid-tight housing further comprises couplers that extend downwardly from the body on opposite sides of the fluid-tight housing. The fluid-tight housing fits over and onto an upper portion of the retaining clip. A portion of the couplers is sized and shaped to fit within a space between the receiving legs.

According to some embodiments, the fluid-tight housing is overmolded onto a portion of the retaining clip. In other embodiments, the receiving legs comprise latching arms. The fastener assembly further comprises a male fastening member that is configured to be inserted between the receiving legs of the retaining clip. The latching arms are configured to deflect into an opening of the male fastening member to securely couple the retaining clip to the male fastening member.

Figure 1:
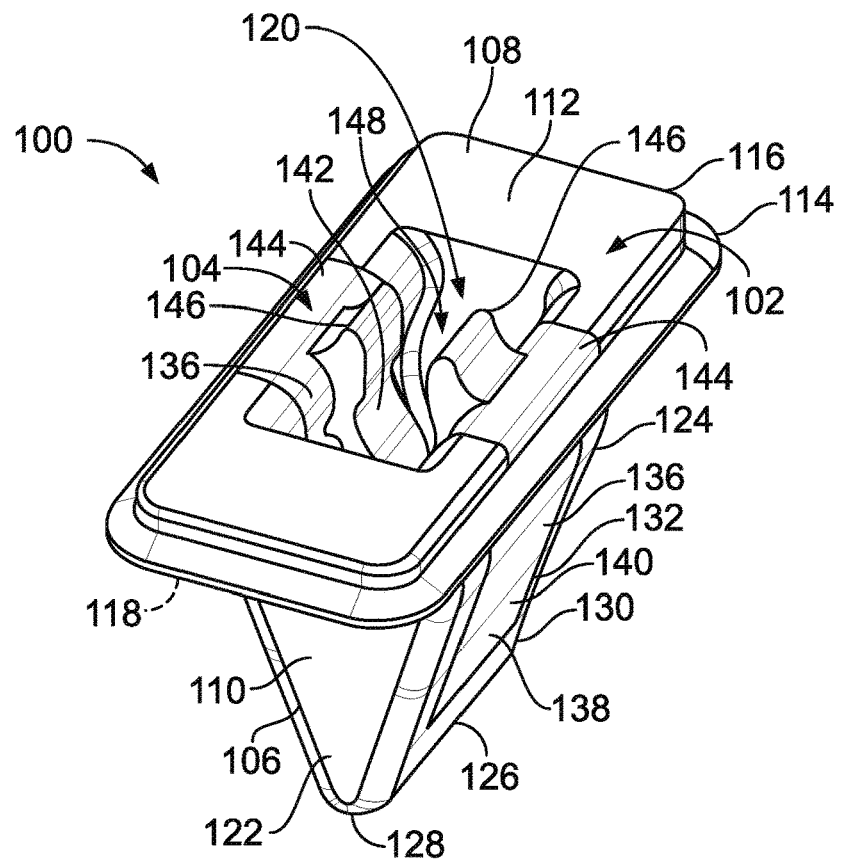
FIG. 1 illustrates a perspective top view of a fluid-tight fastener assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide fluid-tight fastener assemblies. In at least one embodiment, a fluid-tight fastener assembly includes a fluid-tight housing in the form of an overmolded portion that couples to a clip. The fluid-tight housing prevents liquid infiltration therethrough. The sealed housing is fluid-tight, and prevents liquid (and/or gas) from passing therein and therethrough.

The fluid-tight housing may be formed of a relatively soft material, such as an elastomeric material (for example, rubber), while the clip may be formed of a plastic that is harder than the housing. Because the housing is formed of a relatively soft material (such as rubber or other such elastomeric material), the housing is resilient and deformable. The housing provides a watertight seal with a component to which the fastener assembly secures. For example, portions of the housing that contact a component (for example, a panel) provide a watertight interface therewith.

In at least one embodiment, a fluid-tight fastener assembly includes a mechanical coupling between components of the fastener assembly that provides a watertight seal. In particular, an overmolded housing (for example, a cover) mechanically couples to a fastener that includes a retaining clip. The resilient housing (which may be formed of rubber) provides a watertight seal with a hole of a panel.

Embodiments of the present disclosure provide fluid-tight fastener assemblies that provide a watertight interface with a component. The fastener assembly includes a housing and a clip. The housing is formed of a material, such as rubber, that provides a fluid-tight interface with the component.

The fluid-tight fastener assemblies may include a female fastening member and a male fastening member, such as shown and described in U.S. Pat. No. 9,303,665, entitled "Adaptable Mating Fastener Assembly," which is hereby incorporated by reference in its entirety.

Figure 2:
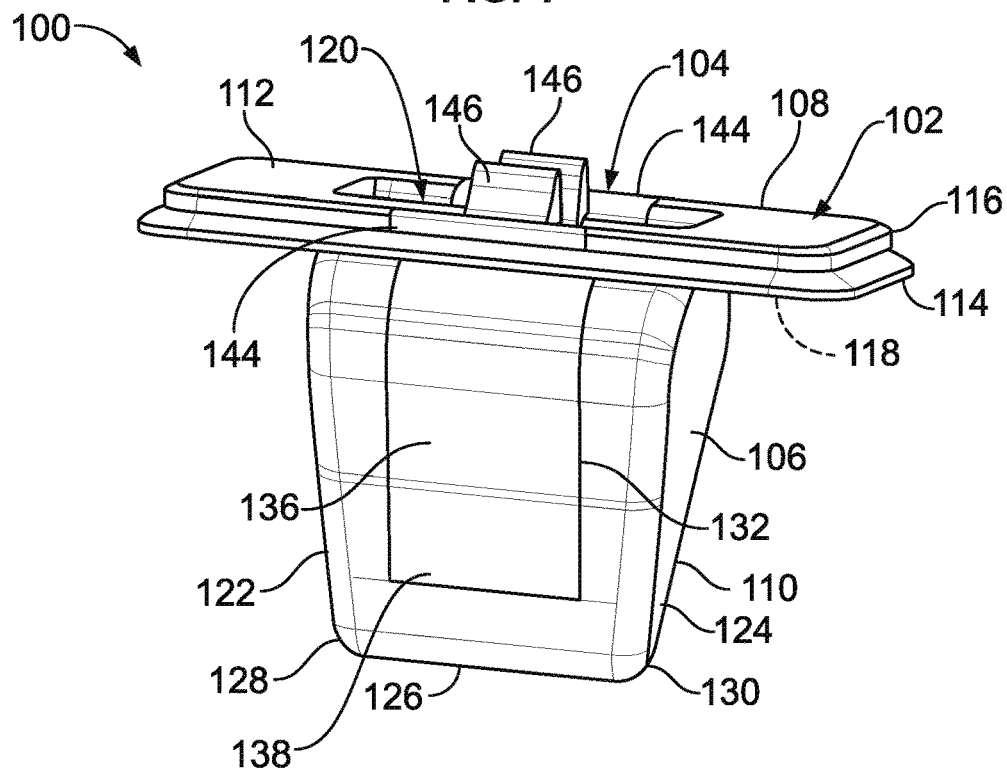
FIG. 2 illustrates a perspective lateral view of a fluid-tight fastener assembly, according to an embodiment of the present disclosure.
Figure 3:
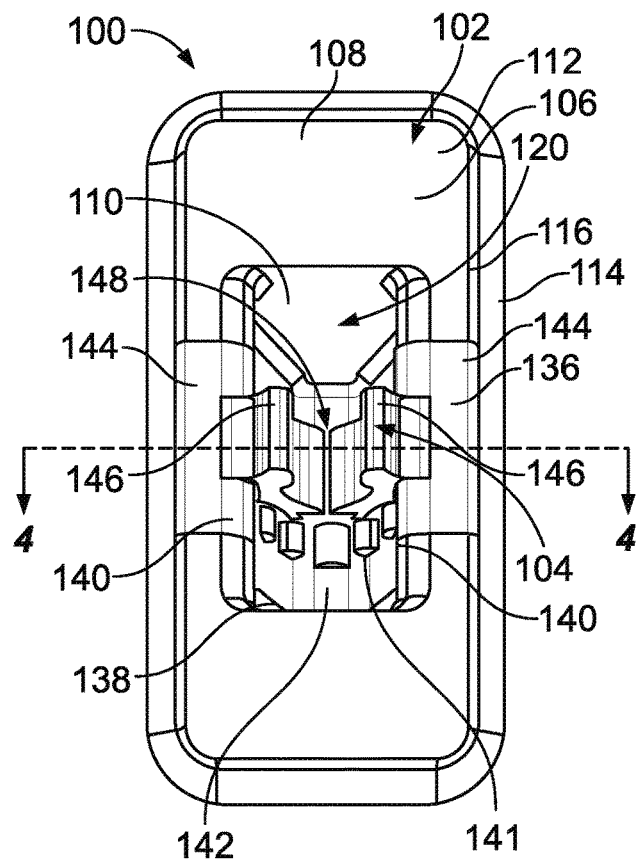
FIG. 3 illustrates a top view of a fluid-tight fastener assembly, according to an embodiment of the present disclosure.
Figure 4:
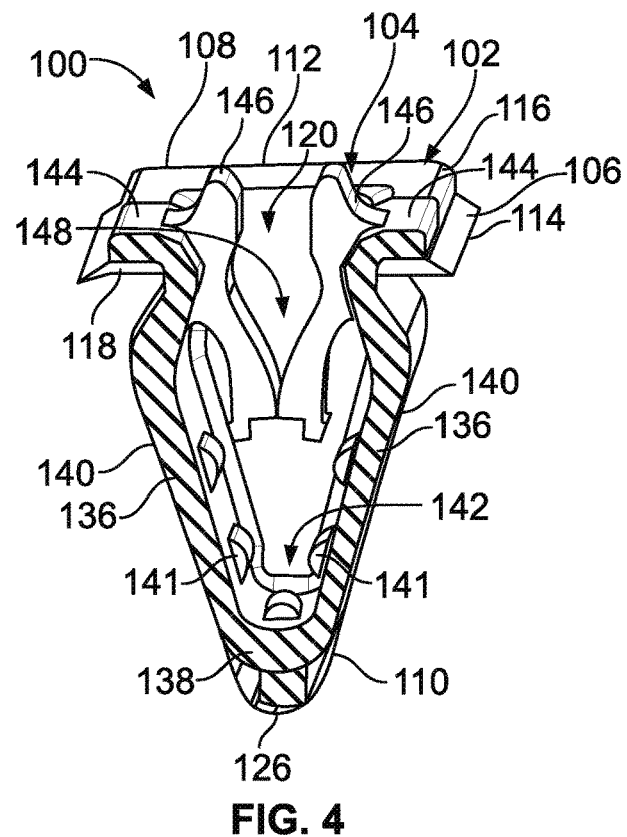
FIG. 4 illustrates a cross-sectional view of a fluid tight fastener assembly through line 4-4 of FIG. 3, according to an embodiment of the present disclosure.

FIG. 1 illustrates a perspective top view of a fluid-tight fastener assembly 100, according to an embodiment of the present disclosure. FIG. 2 illustrates a perspective lateral view of the fluid-tight fastener assembly 100. FIG. 3 illustrates a top view of the fluid-tight fastener assembly 100. FIG. 4 illustrates a cross-sectional view of the fluid tight fastener assembly 100 through line 4-4 of FIG. 3.

Referring to FIGS. 1-4, the fluid-tight fastener assembly 100 includes a fluid-tight housing 102 and a retaining clip 104 secured to the fluid-tight housing 102. The fluid-tight housing 102 provides an overmolded portion that couples to the retaining clip 104. The fluid-tight housing 102 prevents liquid infiltration therethrough.

The fluid-tight housing 102 may be formed of a relatively soft, fluid-tight material, such as an elastomeric material (for example, rubber), while the retaining clip 104 may be formed of a plastic that is harder than the fluid-tight housing 102. Because the fluid-tight housing 102 is formed of a relatively soft material (such as rubber or other such elastomeric material), the fluid-tight housing 102 is resilient, deformable, and conforms to a shape of a component to which the fluid-tight fastener assembly 100 secures. Portions of the fluid-tight housing 102 that contact a component (for example, a panel) provide a watertight interface therewith.

The fluid-tight housing 102 includes a main body 106 that includes a base 108 integrally formed with leg retainer 110. The base 108 may be formed having a rectangular shape, as shown. Optionally, the base 108 may be formed in various other shapes and sizes, such as circular, triangular, irregularly-shaped, and the or the like.

The base 108 includes a planar first surface 112, a coupling flange 114 outwardly extending below an outer edge 116 of the first surface 112, and a second surface 118 opposite from the first surface 112. A central clip channel 120 is formed through the base 108 and extends into the leg retainer 110.

The leg retainer 110 includes opposed wedge-shaped ends 122 and 124 extending downwardly (as shown in the orientation of FIG. 1) from the second surface 118. The wedge-shaped ends 122 downwardly and inwardly-angle from the second surface 118 towards a distal connecting beam 126 that extends between distal apex ends 128 and 130 of the respective wedge-shaped ends 122 and 124. Leg openings 132 are defined between the second surface 118, the wedge-shaped ends 122, 124, and the connecting beam 126 on either side of the leg retainer 110.

The retaining clip 104 provides a female fastening member, and includes opposed receiving legs 136 connected together at a distal hinge 138. The hinge 138 allows the opposed receiving legs 136 to flex toward one another. The hinge 138 and leg retainer 110 may be inserted into an opening of a panel. During insertion, the opposed receiving legs 136 may flex toward one another and snapably secure into position.

Each receiving leg 136 may include a connection beam 140 that outwardly angles from the hinge 138. A channel may be formed through each connection beam 140. The channel may provide flexibility to the connection beam 140.

Optionally, the connection beam 140 may not include the channel if a more rigid connection beam 140 is desired.

The connection beams 140 may include leading edge-engaging protuberances 141 (hidden from view in FIGS. 1 and 2) extending inwardly into a space 142 between the opposed receiving legs 136. The protuberances 141 may be proximate to the hinge 138, and may be or include a rounded nub, barb, clasp, or the like configured to slidably engage a leading edge of a tongue of a male fastening member.

An out-turned tab 144 may outwardly extend from proximal ends of the connection beams 140. An internally-directed latching arm 146 extends from an internal surface of the connection beam 140 into the internal space 142. The latching arms 146 of the opposed receiving legs 136 are angled toward another and mirror one another. At least portions of the latching arms 146 may be separated by a gap 148. The latching arms 146 are configured to securely latch onto a separate structure, such as a male fastening member.

The retaining clip 104 may be sized and shaped differently than shown. The retaining clip 104 may include more or less features than shown. For example, the retaining clip 104 may not include the protuberances 141.

As shown, the fluid-tight housing 102 may be overmolded onto the retaining clip 104. The connection beams 140 extend into the central clip channel 120 and are secured within the leg openings 132. The out-turned tabs 144 are secured over the base 108, such as within reciprocal channels formed in the first surface 112. The fluid-tight housing 102 provides a fluid-tight interface with the retaining clip 104. Further, when secured to one or more components, the portions of the fluid-tight housing 102 that abut into the component(s) form fluid-tight interfaces therewith. For example, the first surface 112 abuts into a surface of a component and forms a fluid-tight interface therewith, thereby preventing or otherwise reducing a possibility of liquid infiltrating from the fluid-tight housing 102 into the component, or vice versa. The fluid-tight interface reduces a likelihood of liquid passing into the central clip channel 120 when the fluid-tight fastener assembly 100 is secured to the component(s).

Additionally, the coupling flange 114 provides a flight tight seal with a component. For example, a component may abut into the second surface 118. The coupling flange 114 and the second surface 118 sealingly engage the component. Further, the leg retainer 110 sealingly engages portions of structure that are coupled thereto. In general, the portions of the fluid-tight housing 102 that directly couple to another component and/or the retaining clip 104 provide sealing interfaces therewith that prevent or otherwise reduce a likelihood of liquid infiltration therethrough.

Figure 5:
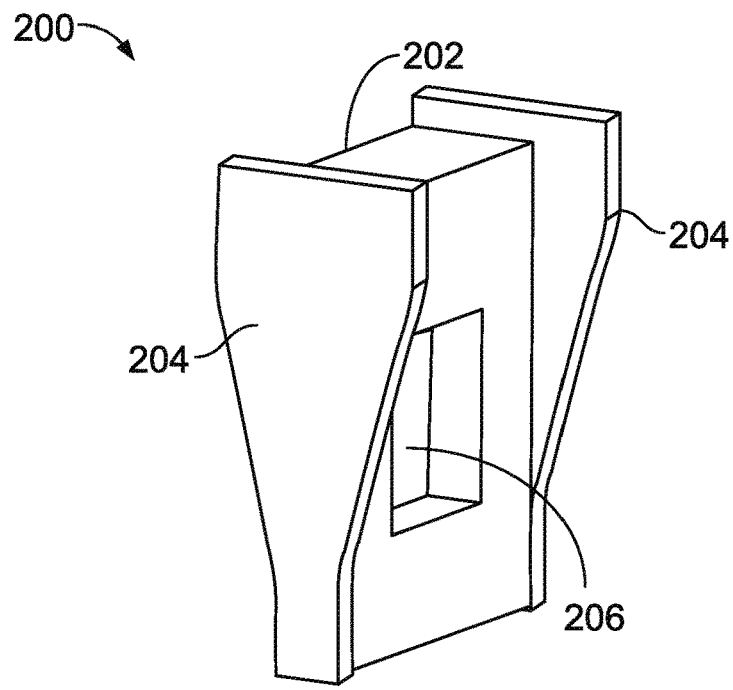
FIG. 5 illustrates a perspective front view of a male fastening member, according to an embodiment of the present disclosure.

FIG. 5 illustrates a perspective front view of a male fastening member 200, according to an embodiment of the present disclosure. The male fastening member 200 includes a central panel 202 between perpendicular end walls 204. An opening 206 is formed through the central panel 202.

Referring to FIGS. 1-5, the male fastening member 200 is configured to be positioned between opposed receiving legs 136, such that the protuberances 141 and/or portions of the latching arms 146 are securely retained within the opening 206, thereby securing the male fastening member 200 to the retaining clip 104. As the male fastening member 200 is urged between the opposed receiving legs 136, the receiving legs 136 outwardly deflect (and the fluid-tight housing 102 resiliently moves in response thereto) until the protuberances 141 and/or the portions of the latching arms 146 move into the opening 206, at which point the receiving legs 136 inwardly deflect back to their at-rest positions.

Figure 6:
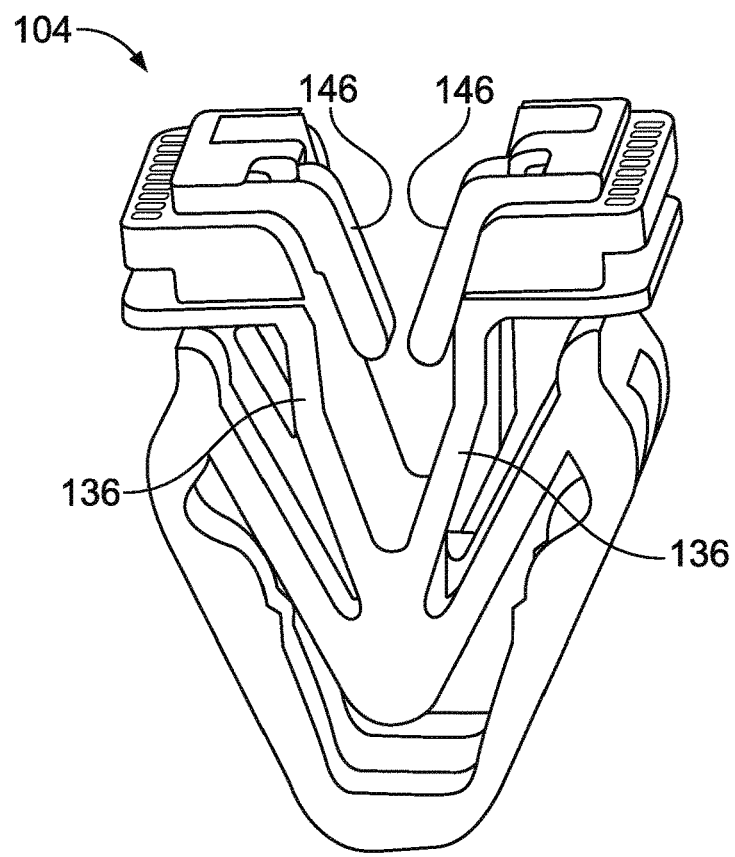
FIG. 6 illustrates a perspective end view of a retaining clip, according to an embodiment of the present disclosure.

FIG. 6 illustrates a perspective end view of a retaining clip 104, according to an embodiment of the present disclosure. The retaining clip 104 is similar to the retaining clip shown in FIGS. 1-4. The retaining clip 104 includes opposed receiving legs 136 having latching arms 146.

Figure 7:
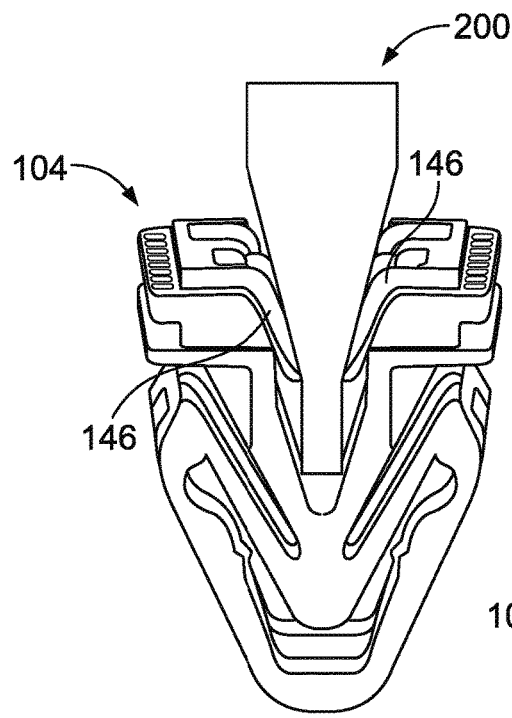
FIG. 7 illustrates a perspective end view of a male fastening member inserted between receiving legs of a retaining clip, according to an embodiment of the present disclosure.

FIG. 7 illustrates a perspective end view of the male fastening member 200 inserted between the receiving legs 136 of the retaining clip 104. Referring to FIGS. 5 and 7, the latching arms 146 are configured to deflect into the opening 206 to securely couple the retaining clip 104 to the male fastening member 200.

Figure 8:
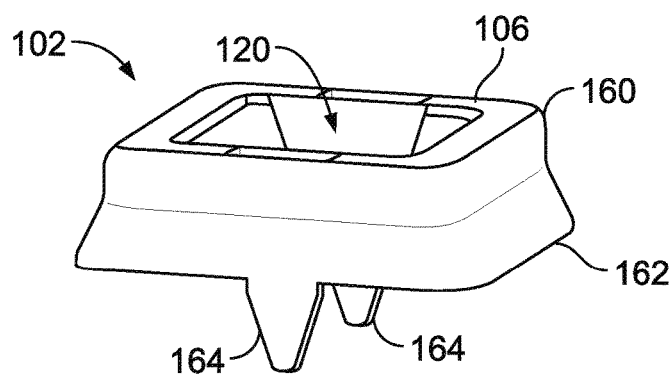
FIG. 8 illustrates a perspective top view of a fluid-tight housing, according to an embodiment of the present disclosure.

FIG. 8 illustrates a perspective top view of a fluid-tight housing 102, according to an embodiment of the present disclosure. The fluid-tight housing 102 includes a main body 106 in the form of a cover that include an outer cap 160 and an outwardly-flared skirt 162 extending from the cap 160. A central clip channel 120 is formed through the main body 106. Triangular couplers 164 extend downwardly from the skirt 162 on opposite sides of the fluid-tight housing 102. The fluid-tight housing 102 provides a cover or cap that fits over and onto an upper portion of the retaining clip 104 (shown in FIGS. 6 and 7).

Figure 9:
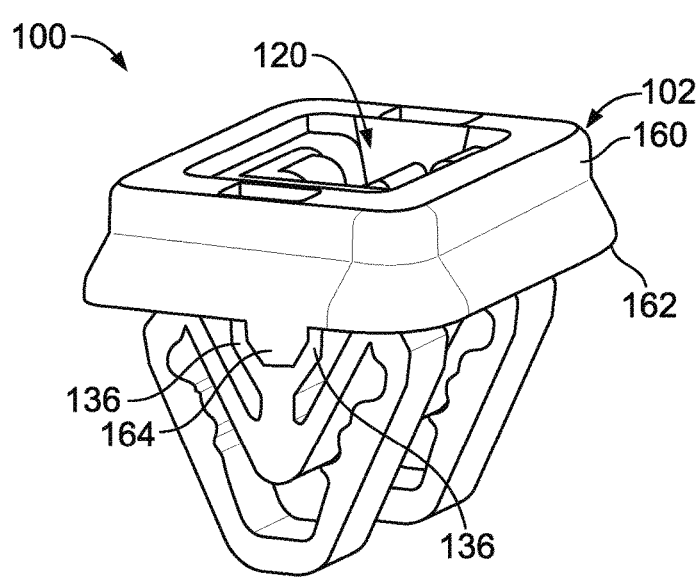
FIG. 9 illustrates a perspective end view of a fluid-tight fastener assembly, according to an embodiment of the present disclosure.

FIG. 9 illustrates a perspective end view of a fluid-tight fastener assembly 100, according to an embodiment of the present disclosure. The fluid-tight fastener assembly 100 includes the retaining clip 104 (shown in FIGS. 6 and 7) and the fluid-tight housing 102 (shown in FIG. 8). The fluid-tight housing 102 is formed of an elastomeric material, such as rubber, that is configured to provide a fluid-tight interface with a component, while the retaining clip 104 may be formed of a relatively harder material, such as a plastic. As shown, the cap 160 fits over a top end (as shown in the orientation of FIG. 9) of the retaining clip 104, while the skirt 162 fits around portions of ends and sides of the retaining clip, thereby providing a fluid-tight shield in relation to the retaining clip 104. The couplers 164 are sized and shaped to fit within a space between receiving legs 136.

Similar to the fluid-tight housing 102 shown and described with respect to FIGS. 1-4, the fluid-tight housing 102 shown in FIGS. 8 and 9 provides fluid-tight interfaces with portions of structures that abut into the fluid-tight housing 102. The fluid-tight housing 102 may be overmolded onto the retaining clip 104.

Referring to FIGS. 1-9, embodiments of the present disclosure provide fluid-tight fastener assemblies 100 that are configured to provide watertight interfaces with one or more components. The fluid-tight fastener assemblies 100 include a fluid-tight housing 102 and a retaining clip 104. The fluid-tight housing 102 is formed of a material, such as rubber, that provides a fluid-tight interface with the component(s).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener assembly that is configured to securely couple to one or more components, the fastener assembly comprising:
   a retaining clip; and
   a fluid-tight housing coupled to the retaining clip, wherein the fluid-tight housing is configured to provide fluid-tight interfaces with the retaining clip and the one or more components,
   wherein a central clip channel is formed through the fluid-tight housing, and
   wherein the fluid-tight housing comprises an outer cap and an outwardly-flared skirt extending from the outer cap, and wherein the fluid-tight housing further comprises couplers extending downwardly from the fluid-tight housing on opposite sides of the central clip channel of the fluid-tight housing.

2. The fastener assembly of claim 1, wherein the fluid-tight housing is overmolded onto a portion of the retaining clip.

3. The fastener assembly of claim 1, wherein the fluid-tight housing is formed of rubber, and wherein the retaining clip is formed of plastic.

4. The fastener assembly of claim 1, wherein the fluid-tight housing provides a cover that fits over and onto an upper portion of the retaining clip.

5. The fastener assembly of claim 1, wherein the retaining clip comprises opposed receiving legs connected together at a distal hinge.

6. The fastener assembly of claim 5, further comprising a male fastening member that is configured to be securely coupled to the retaining clip between the opposed receiving legs.

7. A fastener assembly that is configured to securely couple to one or more components, the fastener assembly comprising:
   a retaining clip comprising opposed receiving legs connected together at a hinge; and
   a fluid-tight housing coupled to the receiving legs and comprising a central clip channel formed through the fluid-tight housing, wherein the fluid-tight housing is configured to provide fluid-tight interfaces with the retaining clip and the one or more components, and wherein the fluid-tight housing is overmolded onto a portion of the retaining clip,
   wherein the fluid-tight housing comprises a cap and an outwardly-flared skirt extending from the cap, and wherein the fluid-tight housing further comprises couplers extending downwardly from the fluid-tight housing on opposite sides of the central clip channel.

8. The fastener assembly of claim 7, wherein the couplers are secured to the receiving legs.

9. The fastener assembly of claim 8, wherein the couplers are configured to fit within a space between the receiving legs.

10. The fastener assembly of claim 8, wherein the fluid-tight housing comprises a base integrally formed with the retaining clip.

11. The fastener assembly of claim 7, wherein the receiving legs comprise latching arms.

12. The fastener assembly of claim 7, wherein the retaining clip extends through the central clip channel of the fluid-tight housing.

13. The fastener assembly of claim 7, further comprising a male fastening member that is configured to be securely coupled to the retaining clip between the opposed receiving legs.

14. The fastener assembly of claim 7, wherein the retaining clip is formed of a plastic, and wherein the fluid-tight housing is formed of rubber that is softer than the plastic.

15. A fastener assembly that is configured to securely couple to one or more components, the fastener assembly comprising:
   a retaining clip comprising opposed receiving legs; and
   a fluid-tight housing comprising a body that includes an outer cap and an outwardly-flared skirt extending from the outer cap, and wherein the fluid-tight housing further comprises couplers extending downwardly from the body on opposite sides of the fluid-tight housing,
   wherein the fluid-tight housing fits over and onto an upper portion of the retaining clip, and wherein a portion of the couplers is sized and shaped to fit within a space between the receiving legs.

16. The fastener assembly of claim 15, wherein the fluid-tight housing is overmolded onto a portion of the retaining clip.

17. The fastener assembly of claim 15, wherein the receiving legs comprise latching arms.

18. The fastener assembly of claim 17, further comprising a male fastening member that is configured to be inserted between the receiving legs of the retaining clip.

19. The fastener assembly of claim 18, wherein the latching arms are configured to deflect into an opening of the male fastening member to securely couple the retaining clip to the male fastening member.

* * * * *